C. BISSELL.
Horse Rake.
No. 64,475.
Patented May 7, 1867.
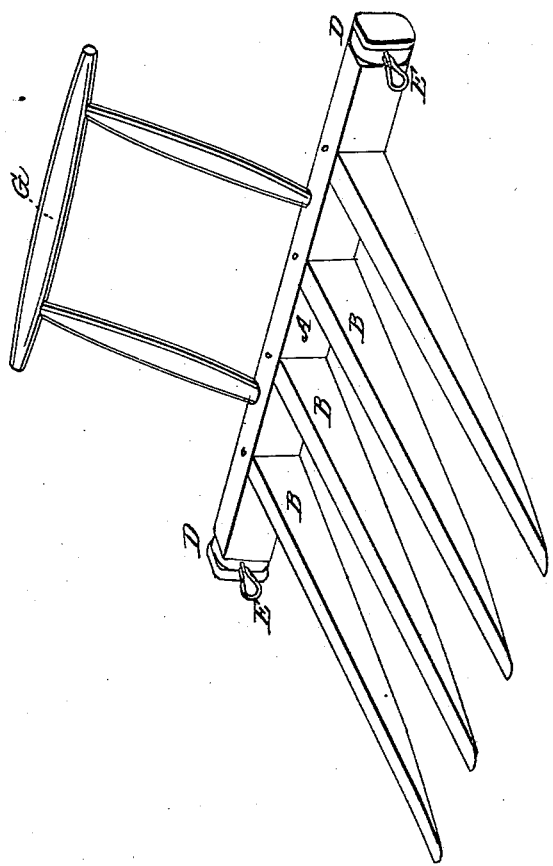
Witnesses:
Inventor:

United States Patent Office.

CALVIN BISSELL, OF AURORA, OHIO.

Letters Patent No. 64,475, dated May 7, 1867.

HAND-RAKE.

The Schedule referred to in these Letters Patent and making part of the same.

TO ALL WHOM IT MAY CONCERN:

Be it known that I, C. BISSELL, of Aurora, in the county of Portage, and State of Ohio, have invented certain new and useful improvements in a Hand-Rake, &c.; and I do hereby declare that the following is a full and complete description of the construction and operation of the same, reference being had to the drawing, making a part of this specification.

This rake may be used in place of the common hand-rake for finishing up the work in the field by gathering the hay as desired. It may be light in structure, so as to be easily pushed along by the handle. It is readily handled and operated, and will do more work than the ordinary hand-rake, and equally as well. With simplicity of structure are combined lightness, strength, and durability. It is quite inexpensive, and not at all liable to fall out of repair.

A is the head of the rake, in which are inserted the teeth B, and which may be in number more or less, according to the size of the implement required. The shape and position of the teeth in relation to the head are shown in the drawing. G is the handle, by which the rake is held and directed. D are bands fitted loosely to the grooves cut in the ends of the rake, and by which it may be drawn by hitching a horse to the clevis E.

The practical operation of this rake is as follows: The operator walks behind the rake, holding the same by the handles referred to, pushing and guiding the rake in the direction of the work. When sufficient hay has gathered upon the teeth, and which is prevented from passing over the rake to the rear by the handle, it is then discharged either by turning the rake over, or by lifting it from the hay.

What I claim as my improvement, and desire to secure by Letters Patent, is—

The herein-described rake, in its special construction and arrangement, in the manner and for the purposes specified.

CALVIN BISSELL.

Witnesses:
   W. H. BURRIDGE,
   J. HOLMES.